UNITED STATES PATENT OFFICE.

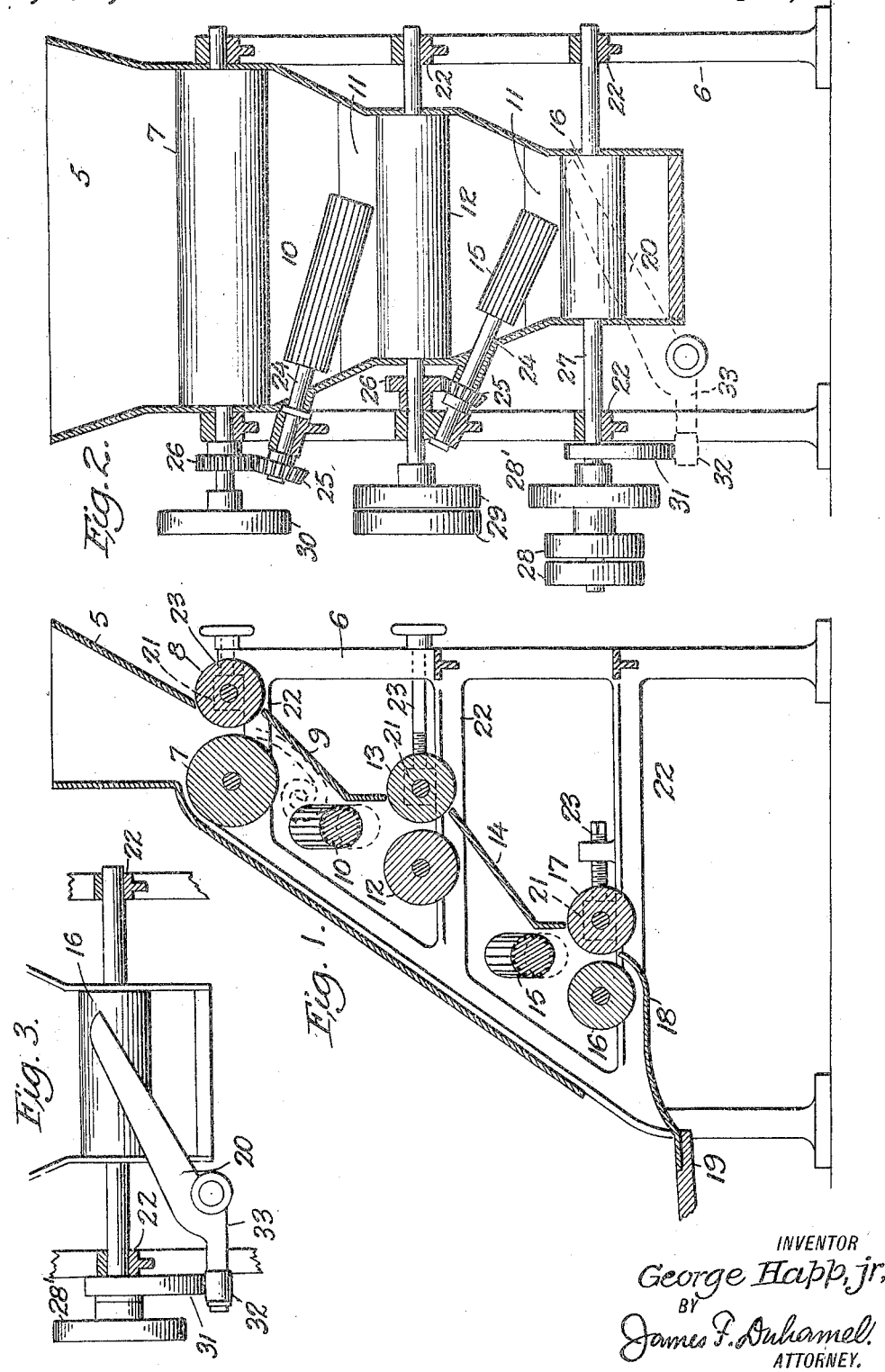

GEORGE HAPP, JR., OF PORT JERVIS, NEW YORK.

DOUGH-DIVIDER.

1,373,811.  Specification of Letters Patent.  Patented Apr. 5, 1921.

Application filed September 20, 1919. Serial No. 325,224.

*To all whom it may concern:*

Be it known that I, GEORGE HAPP, Jr., a citizen of the United States, residing at Port Jervis, Orange county, New York, have invented certain new and useful Improvements in Dough-Dividers, of which the following is a specification.

This invention relates to machines and methods for kneading and dividing dough and has for its object, the elimination of means heretofore used by which the dough is compressed and the gases forced from the batch, causing delay in the generation of additional gases and waste of time in the preparation of the dough for rolls or loaves. The operation of this improved method and machine retains the mass of dough in a homogeneous state until cut up for baking and may squeeze out the superfluous air and gas. During the kneading of the dough and where it is alternately compressed and left free, the source of said gas is left undisturbed and the mass of dough is not mutilated until cut into appropriate lengths by a suitable knife of wire or a single blade.

These and other objects and details of the invention are more fully described in the following specification, set forth in the appended claims and shown in the accompanying drawings, wherein:

Figure 1 is a vertical cross sectional view of the improved kneader and divider.

Fig. 2 is a vertical longitudinal sectional view,

Fig. 3 is a detail view of the cutter.

The device comprises the hopper 5, located at the upper end of a frame 6 and at the bottom of the hopper are the two rollers 7 and 8 adapted to travel toward each other, so that when a batch of dough is placed in the press hopper 5, it is fed through the rollers in a sheet and delivered on the inclined chute 9 and down which it falls until arrested by the corrugated roller 10 at the lower end of the chute and inclined at an angle from the rollers 7 and 8.

The roller 10 rotates upward at the side adjacent the chute and catches the end of the sheet of dough and rolls it backward on itself, as shown in dotted lines in Fig. 1, and when the mass reaches an unwieldy proportion, it falls from the end of said roller 10, into the space 11 at its outer end and upon the rollers 12 and 13. Here again the dough is pressed into a sheet and glides down the chute 14, to be gathered up and again rolled into a mass by the inclined corrugated roller 15 and wound until the unwieldy mass slides off the roller and into the rollers 16 and 17, where it is again pressed into a sheet and delivered upon the chute 18 and table 19, where it is finally encountered by the knife 20, to cut it into appropriate sizes.

The frame 6 is preferably constructed as shown and the shafts of rollers, 8, 13 and 17, are journaled in sliding boxes 21, that are adjusted along the horizontal braces 22 by means of the screws 23.

The corrugated rollers 10 and 15 are set at any desired angle that is best adapted to shed the mass of rolled dough into the open space 11 and the lower compressing rollers and their shafts 24, carry pinions 25, to mesh directly, or through idlers if necessary, with gear wheels 26, on the shafts of the rollers 7 and 12 respectively.

Driving power is applied to the lower shaft 27 by means of one of the pulleys 28 and through the pulleys 28', 29 and 30, the other shafts are driven. The shaft 27 also carries the cam 31, which operates on a roller 32, at the outer end of the knife handle 33, to oscillate the knife and cut the dough into appropriate lengths at the end of table 19.

The dough that is deposited in the hopper 5 is evenly pressed and passed to the chute 9, where it expands and is caught by the roller 10 and wound into a roll and dropped into the rollers 12 and 13, below to be again compressed into a sheet, expanded when released and rewound by the corrugated roller 15 and finally thrown as a mass, into the rollers 16 and 17, where it receives its final compression, allowed to expand and is passed out to table 19. This operation is a succession of kneadings, in which the dough is worked so as to force out air bubbles and lumps, making the whole mass of the same density and even constituency throughout.

It is obvious that the rollers are not restricted to the three sets and the accompanying two corrugated rollers, as shown, but the number may be increased or decreased to conform with the requirements of various flours or doughs. Other modifications and arrangements may also be resorted to without departing from the essential features above described or from the scope of the appended claims.

What I claim as new is:—

1. In a dough divider, the combination of an upright frame adapted to receive dough in a mass or batch at its top, compression rollers within the top and adapted to form the mass of dough into a sheet, a roller adapted to intercept the sheet of dough and form it into a coiled mass, and a second set of compression rollers adapted to receive the coiled mass of dough from the mass-forming roller and compress it into a sheet.

2. In a dough divider, the combination of an upright frame having a hopper to receive the mass or batch of dough, compressing means beneath the hopper and adapted to form the dough into a sheet, intercepting means beneath the compressing means to catch the sheet as it falls and roll the sheet into a coiled mass and drop it after attaining a certain size, a second set of compressing means beneath the intercepting means and adapted to arrest the mass of dough and convert it into a sheet, and a knife to divide the sheet.

3. In a dough divider, the combination of a frame having a hopper at its top, rollers in the lower end of the hopper and adapted to compress the dough into a sheet, a roller on a downwardly inclined shaft with lower free end beneath the compressing rollers and extending partly across the frame, a second set of compressing rollers, a second inclined roller beneath the latter, and a knife to cut the dough.

4. In a dough divider, the combination of an upright frame having a hopper at its upper end, a series of compressing rollers for the dough from the hopper, a series of corrugated rollers journaled at one end in the frame and inclined downward at the other and leaving intervals between their ends and the other side of the frame, an intermittently operating knife adjacent the lower compression rollers, and driving means turning the compression rollers downward and the corrugated rollers upward.

In testimony whereof, I have signed my name to this specification in the presence of two subscribing witnesses, this 9th day of Sept., 1919.

GEORGE HAPP, JR.

Witnesses:
 F. D. FOWLER,
 HELEN E. WILLIAMS.